G. T. GREER.
HOSE COUPLING.
APPLICATION FILED AUG. 20, 1912.
1,073,850.
Patented Sept. 23, 1913.
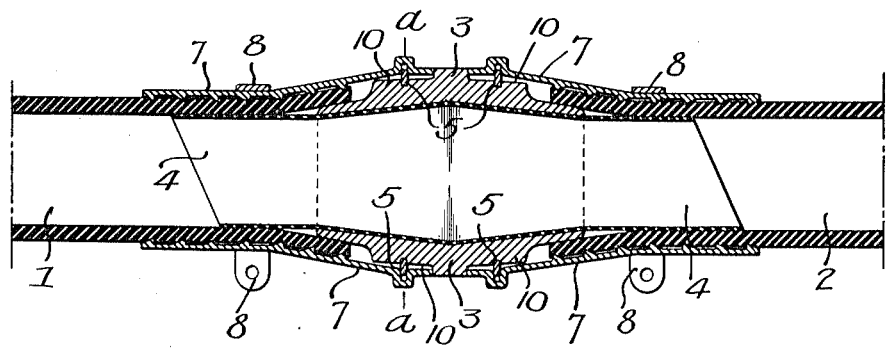
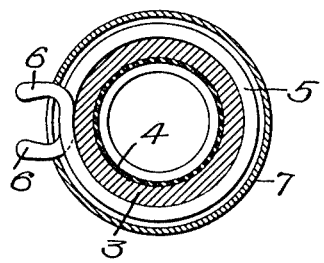
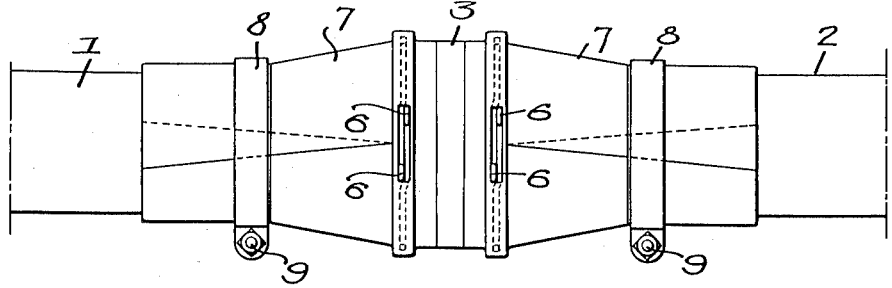
Witnesses:—
Inventor—
George T. Greer.
by his Attorneys.
Howson & Howson

UNITED STATES PATENT OFFICE.

GEORGE T. GREER, OF ROANOKE, VIRGINIA.

HOSE-COUPLING.

1,073,850.  Specification of Letters Patent.  Patented Sept. 23, 1913.

Application filed August 20, 1912. Serial No. 716,029.

*To all whom it may concern:*

Be it known that I, GEORGE T. GREER, a citizen of the United States, residing in Roanoke, Roanoke county, Virginia, have invented certain Improvements in Hose-Couplings, of which the following is a specification.

One object of my invention is to provide a relatively simple, reliable, and inexpensive device for coupling two hose ends, it being desired that the various parts of the device shall be so disposed as to render possible the convenient connection and tight coupling of such hose parts, and that without injury to the latter.

I further desire to provide a coupling with novel means whereby two bodies of hose may be quickly connected together to form a fluid tight conduit whose parts are so arranged that the possibility of leakage of the fluid is reduced as the pressure on the hose is increased.

These objects and other advantageous ends I secure as hereinafter set forth, reference being had to the accompanying drawings, in which, Figure 1 is a plan of a hose coupling constructed according to my invention. Fig. 2 is a vertical longitudinal section of the coupling shown in Fig. 1; and Fig. 3 is a transverse vertical section taken on the line $a$—$a$ of Fig. 2.

In the above drawings 1 and 2 represent the two parts or lengths of hose to be coupled. For the purpose of connecting the same I provide a tubular connecting sleeve 3 internally tapered in both directions from its middle toward its ends and having said ends externally tapered so as to be capable of being forced into the ends of the hose lengths for a short distance as shown in said Fig. 2. The internal diameter of this sleeve 3 at its ends is substantially the same, or slightly greater, than the internal diameter of the hose lengths. For forming a fluid tight connection between it and said hose lengths I provide a piece of relatively thin rubber tubing 4, of such diameter as to closely fit within the same and preferably having its ends beveled as shown in Fig. 2. It is to be understood that this inner tube is sufficiently flexible to be forced out or expanded by the pressure of the fluid within it, so as to be brought thereby into intimate engagement with the inside surfaces of the hose parts 1 and 2 and of the sleeve 3. The latter between its middle and each end is provided with a relatively narrow annular groove for the reception of an expansible spring ring 5 whose ends 6 extend through a suitable slot in the sleeve and preferably overlap each other in such manner that when drawn or forced together the ring is expanded to such an extent as to permit of its being easily freed or removed from said groove.

The connecting sleeve 3 is connected to each of the hose lengths by means of a holding sleeve 7, which consists of a tube longitudinally split for about three quarters of its length and overlapped at said split portion to provide a structure of such diameter as to closely fit one of the hose lengths 1 or 2 when it is contracted, as, for example, by means of a clamping band 8, whose ends may be connected by a bolt or screw 9 as shown. The interior of this holding sleeve 7 is barbed or roughened so that when tightly pressed toward the hose within it, it will grip the same so as to prevent its slipping. The opposite end of this sleeve is of a sufficient diameter to closely fit over a suitably formed part of the connecting sleeve 3 between its middle and one end, and it is internally grooved so as to receive the spring ring 5; the depth of said groove being such that while it permits of a sufficient expansion of said ring to allow of its withdrawal from the groove in the sleeve 3, it still retains the ring under normal conditions, when the latter is so contracted as to enter said groove in said sleeve 3.

Under conditions of use the tapered end of the connecting sleeve 3 is entered in the hose length 1, for example, after the fully expanded holding sleeve 7 with its spring ring 5, has been slipped over the same. Said sleeve 7 is then moved outwardly over the slightly flared end of the hose so that the spring ring is first expanded by the part 10 of the connecting sleeve 3 and finally springs into the groove thereof, thus connecting to it said tube 7. After the inner tube 4 has been placed within the sleeve 3 and entered in the hose end 1, as shown, the clamp 8 may be applied so as to force the barbs or sharpened projections of the holding sleeve 7 into the exterior surface of the hose length 1, the edges of the split portion of said tube overlapping to a greater or less extent as it is contracted.

The second hose length 2 with the second holding sleeve 7 mounted on it is then forced on to the second end of the connecting sleeve 3 and said sleeve 7 is then moved to such position as to be coupled to the sleeve 3 by its spring ring; the second of the clamps 8 being finally set up thus rendering the coupling ready for use.

When filled with fluid under pressure, the inner tube 4 is forced against the inner walls of the hose lengths and of the connecting sleeve 3 so as to form a fluid tight joint therewith, while the barbs or projections of the holding sleeves 7, as well as the spring rings 5 prevent the pulling apart or separation of the connecting sleeve 3 and the hose lengths.

It is obvious that when desired the hose lengths may be conveniently and quickly separated by forcing together the ends 6 of either of the spring rings 5 which as shown in Fig. 3, project through slots in their respective holding sleeves 7, when the latter may be removed from the connecting sleeve 3 and the hose length be withdrawn from the latter sleeve by removing or slacking off the bolt 9 of the clamp 8.

One desirable result secured by the use of the above described coupling is that it has no tendency to injure or destroy the inner tube or lining of the hose and at the same time, the holding sleeves 7 to a great extent protect the ends of the hose lengths. Again by reason of the expansion of the inner rubber tube 4 of the coupling as shown in Fig. 2, the tendency of the hose lengths 1 and 2 to separate is further lessened.

Altogether the device is of such a nature as to be easily applied to and removed from two lengths of hose; and the construction is such as to render it not only inexpensive to manufacture, but highly efficient and reliable in use.

If preferred the coupling may be applied by slipping each of the sleeves 7 over the end of one of the hose lengths and then setting up the clamping rings. Thereafter the tapered ends of the connecting sleeve 3 with the inner tube may be entered in the ends of the sleves 7, as shown, until the spring rings 5 enter the channels in said connecting sleeve when the coupling is ready for use.

A distinctive feature of my coupling is that its parts do not materially diminish the area of cross section of the liquid flowing through the hose lengths which it connects.

I claim:

1. The combination in a hose coupling, of a sleeve formed to enter two hose lengths, said sleeve having its interior tapered from its middle toward the ends; means for holding said lengths to said sleeve; and an expansible tube mounted in the sleeve and forming a continuous lining therefor, said tube having its ends extending beyond the ends of the sleeve and for a substantial distance into the hose lengths.

2. The combination in a hose length of a sleeve formed to enter a hose; means for holding said sleeve to the hose, said means including a second sleeve longitudinally split for a portion only of its length and adapted to embrace the exterior of the hose, the edges of the split portion of said second sleeve being arranged to overlap and ride past each other when the sleeve is compressed upon the hose and said split sleeve having an annular recess struck outwardly from an unsplit portion; and means within said recess for detachably connecting the two sleeves.

3. The combination in a hose length of a sleeve formed to enter a hose; means for holding said sleeve to the hose, said means including a second sleeve longitudinally split for a portion only of its length and adapted to embrace the exterior of the hose, the edges of the split portion of said second sleeve being arranged to overlap and ride past each other when the sleeve is compressed upon the hose and said split sleeve having an annular recess struck outwardly from an unsplit portion; means within said recess for detachably connecting the two sleeves; and an inflatable tube mounted in the first-named sleeve and forming a continuous lining therefor, said inflatable tube having its ends extending beyond the ends of said first-named tube and for a substantial distance directly into the hose lengths.

In testimony whereof, I have signed my name to this specification, in the presence of two subscribing witnesses.

GEORGE T. GREER.

Witnesses:
R. L. MORGAN,
S. L. MILLER.